(12) United States Patent
Ahmed et al.

(10) Patent No.: US 11,354,761 B2
(45) Date of Patent: Jun. 7, 2022

(54) SMART REALTOR SIGNS SYNCHRONIZED WITH VEHICLE

(71) Applicant: Toyota Motor North America, Inc., Plano, TX (US)

(72) Inventors: Hazem Ahmed, Plano, TX (US); Dany Benjamin, Rowlett, TX (US); Charan Lota, Frisco, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 652 days.

(21) Appl. No.: 16/162,231

(22) Filed: Oct. 16, 2018

(65) Prior Publication Data

US 2020/0118227 A1    Apr. 16, 2020

(51) Int. Cl.
G06Q 30/06    (2012.01)
G06Q 50/16    (2012.01)
H04N 7/18     (2006.01)

(52) U.S. Cl.
CPC ............ *G06Q 50/16* (2013.01); *H04N 7/185* (2013.01)

(58) Field of Classification Search
CPC ............................. G06Q 50/16; H04N 7/185
See application file for complete search history.

(56) References Cited

U.S. PATENT DOCUMENTS

| | | |
|---|---|---|
| 6,397,208 B1 | 5/2002 | Lee |
| 7,564,377 B2 | 7/2009 | Kimchi et al. |
| 8,103,455 B2 | 1/2012 | Smith et al. |
| 8,799,004 B2 | 8/2014 | Bishop, III et al. |
| 9,128,281 B2 | 9/2015 | Osterhout et al. |
| 9,431,004 B2 | 8/2016 | Bohrer et al. |
| 9,848,081 B2 | 12/2017 | Moshir et al. |
| 9,978,109 B1 | 5/2018 | Catalano |
| 10,009,301 B1 * | 6/2018 | Cheng ............... H04L 51/20 |

(Continued)

FOREIGN PATENT DOCUMENTS

| | | | | |
|---|---|---|---|---|
| CN | 108846621 A | * | 11/2018 | ............... G06K 9/20 |
| CN | 109242563 A | * | 1/2019 | |

OTHER PUBLICATIONS

Baldominos, A.; Blanco, I.; Moreno, A.J.; Iturrarte, R.; Bernárdez, Ó.; Afonso, C. Identifying Real Estate Opportunities Using Machine Learning. Appl. Sci. 2018, 8, 232 (Year: 2018).*

(Continued)

*Primary Examiner* — Michelle T Kringen
(74) *Attorney, Agent, or Firm* — Snell & Wilmer LLP

(57) ABSTRACT

Methods and systems for gathering real estate data. The system includes a vehicle camera configured to detect image data associated with a house and a realtor sign. The system includes a GPS unit configured to detect location data associated with the vehicle. The system also includes an electronic control unit (ECU) configured to determine sign data based on the image data associated with the realtor sign and house data based on the image data associated with the house. The ECU is also configured to determine house location data based on the location data. The system includes a vehicle transceiver configured to communicate the sign data, the house data, and the house location data. The system includes a remote data server configured to receive the sign data, the house data, and the house location data and update the real estate listing data stored in memory.

20 Claims, 10 Drawing Sheets

(56) References Cited

U.S. PATENT DOCUMENTS

| | | | |
|---|---|---|---|
| 10,127,596 B1* | 11/2018 | Franke | G06Q 30/0631 |
| 10,555,155 B2* | 2/2020 | Taylor | H04W 4/80 |
| 2004/0021584 A1 | 2/2004 | Hartz, Jr. et al. | |
| 2006/0235712 A1* | 10/2006 | Rodriguez | G06Q 40/04 |
| | | | 705/37 |
| 2009/0012857 A1* | 1/2009 | Schelfaut | G06Q 50/16 |
| | | | 705/14.73 |
| 2013/0099926 A1* | 4/2013 | Peterson | G09F 7/22 |
| | | | 340/542 |
| 2013/0198004 A1 | 8/2013 | Bradley et al. | |
| 2013/0311253 A1* | 11/2013 | Sabella | G06Q 50/167 |
| | | | 705/316 |
| 2015/0356576 A1 | 12/2015 | Malaviya et al. | |
| 2016/0019590 A1 | 1/2016 | Coyle | |
| 2016/0034996 A1* | 2/2016 | Min | G06Q 40/025 |
| | | | 705/26.61 |
| 2016/0292740 A1* | 10/2016 | Akhavan-Saraf | H04B 5/0031 |
| 2017/0132728 A1 | 5/2017 | Westerberg | |
| 2017/0154390 A1* | 6/2017 | Lee | G06Q 50/16 |
| 2018/0091596 A1 | 3/2018 | Alvarez et al. | |
| 2019/0080425 A1* | 3/2019 | Bui | G06Q 10/0631 |
| 2019/0340449 A1* | 11/2019 | Kench | G06F 16/58 |

OTHER PUBLICATIONS

Florentino et al. "Real Estate Brokers in Premium Segment—Marketing and Communication Through Technologies" Evolucao do Parque Habitacional em Portugal 2001-2011; 17 pages; INE 2012.

* cited by examiner

SMART REALTOR SIGNS SYNCHRONIZED WITH VEHICLE

BACKGROUND

1. Field

This specification relates to a system and a method for gathering and distributing real estate data using electronic vehicles.

2. Description of the Related Art

Prospective home buyers conventionally have a few options for finding properties. A first option is to determine a neighborhood or an area the prospective home buyer likes and walk or drive around the area to see if there are any houses for sale, as indicated by one or more signs. A second option is to have a real estate agent conduct a search on the prospective home buyer's behalf. A third option is to view online property listings.

However, with each of these three options, there are significant shortcomings. With the first option of walking or driving around a desired area, the search is tedious, unorganized, and non-comprehensive. With the second option of using a real estate agent, the real estate agent may provide listings for the prospective home buyer's consideration that do not align with the preferences and tastes of the prospective home buyer. With the third option of viewing online property listings, the information provided online across various providers may be outdated or inconsistent. Thus, there is a need for an improved system and method for considering real estate listings.

SUMMARY

What is described is a system for gathering real estate listing data. The system includes a vehicle camera located on a vehicle and configured to detect image data associated with a house and a realtor sign associated with the house. The system also includes a vehicle GPS unit configured to detect location data associated with the vehicle. The system also includes an electronic control unit (ECU) connected to the vehicle camera and the vehicle GPS unit. The ECU is configured to determine sign data based on the image data associated with the realtor sign and house data based on the image data associated with the house. The ECU is also configured to determine house location data based on the location data. The system also includes a vehicle transceiver connected to the ECU and configured to communicate the sign data, the house data, and the house location data. The system also includes a remote data server configured to receive the sign data, the house data, and the house location data and update the real estate listing data stored in memory based on the received sign data, the received house data, and the received house location data.

Also described is a system for distributing real estate listing data. The system may include a vehicle memory configured to store house preference data associated with a user. The system also includes a vehicle transceiver connected to the vehicle memory and configured to communicate the house preference data. The system also includes a network-connected realtor sign associated with a house, and configured to receive the house preference data, compare the house preference data to listing data corresponding to the house, and communicate a match indication to the vehicle transceiver when the house preference data matches the listing data corresponding to the house.

Also described is a method for gathering real estate listing data. The method includes detecting, by a vehicle camera located on a vehicle, image data associated with a house and a realtor sign associated with the house. The method also includes detecting, by a vehicle GPS unit, location data associated with the vehicle. The method also includes determining, by an electronic control unit (ECU) sign data based on the image data associated with the realtor sign and house data based on the image data associated with the house. The method also includes determining, by the ECU, house location data based on the location data. The method also includes communicating, by a vehicle transceiver, the sign data, the house data, and the house location data. The method also includes receiving, by a remote data server, the sign data, the house data, and the house location data. The method also includes updating, by the remote data server, the real estate listing data stored in memory based on the received sign data, the received house data, and the received house location data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for gathering and providing real estate data. Online listings available to the public and databases available to realtors are able to provide renters and buyers with listings of real estate properties on mobile devices and computers. In some situations, the listings are out of date and/or inaccurate. For example, the listings may show that a property is still available, when in reality, the property is no longer available. In another example, the listings may include pictures associated with the property, and the pictures may show a well-manicured lawn with excellent curb appeal, but in reality the lawn may be unkempt and one or more elements of the house may be in need of repair.

If a prospective home buyer were to visit a house that either was no longer available or was not in the condition indicated in outdated photos, the prospective home buyer would waste valuable time and effort. The system and methods described herein provide for an improved updating of listing status and property condition.

The existing technology of real estate listings is necessarily computer-based because without the speed and efficiency of computers and the Internet to connect the computers, the real estate listings (which are already lacking in speed of updating) would be even more deficient. The process of home buying was greatly improved by the use of computerized listings and updating of those listings using the Internet. The systems and methods described herein are a further improvement on that computer-based technology by improving the speed of listing status updates and improving the accuracy of the listings in a technical manner.

Figure 1:
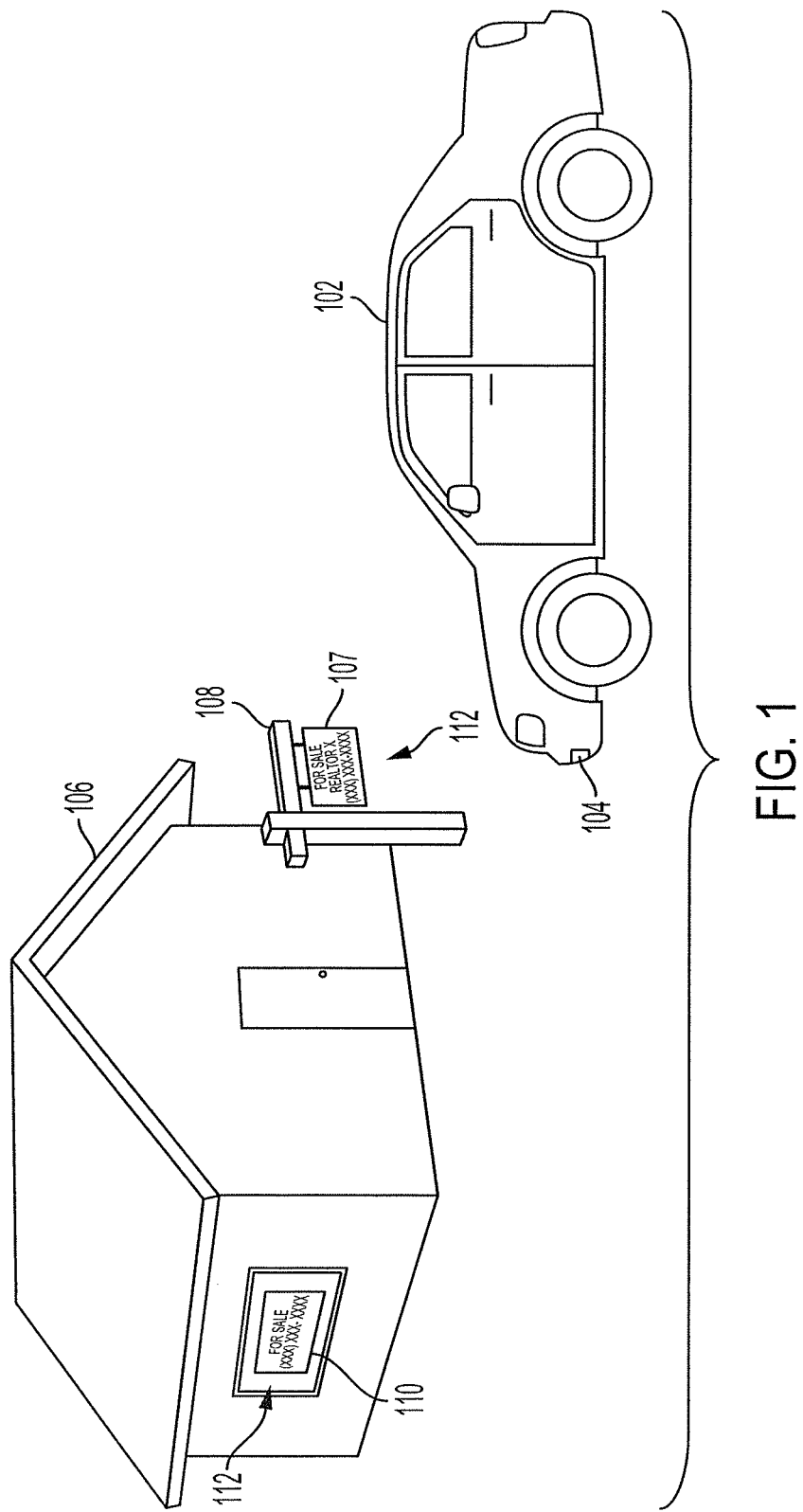
FIG. 1 illustrates an example use of a real estate data gathering system, according to various embodiments of the invention.

FIG. 1 illustrates an exemplary situation using the real estate data gathering and distribution system described herein. A vehicle 102 may be travelling along a road and near a house 106. The house 106 may be available for sale or for rent. The vehicle 102 has one or more cameras 104 configured to detect image data. The one or more cameras 104 may constantly or periodically detect image data of the surroundings of the vehicle 102. For example, the vehicle 102 may be an autonomous vehicle and the one or more cameras 104 may be used by the autonomous driving system of the vehicle 102 to determine the environment surrounding the vehicle 102.

The image data detected by the one or more cameras 104 may include an image or video of a sign. The sign may be a hanging sign 107 attached to a signpost 108 or may be a flat sign 110 that is visible through a window or attached to an exterior of the house 106. The sign (hanging sign 107 or flat sign 110) may include sign data 112. The sign data 112 may include a name of a listing agent, a name of a listing realty company, a phone number, an email address, a fax number, a QR code, or a URL of a webpage, for example. The sign data 112 may also include the address of the house 106 and may also include a status of the house 106, such as for sale, for rent, sold, or under contract, for example. The sign data 112 may also include other information, such as whether the house is being sold directly by the owner, open house information, or house features, for example.

The image data detected by the one or more cameras 104 may include an image or video of the exterior of the house 106. The vehicle 102 may analyze this image or video of the exterior of the house 106 to determine house data. The house data may include a number of windows, a number of garages, a lawn status, number of trees, a status of the windows, a status of the garages, a paint color, a roof status, or a front door status, for example.

The vehicle 102 may also have a GPS unit configured to determine a location of the vehicle 102, and the vehicle 102 may use the location data provided by the GPS unit to determine a location of the house 106. The location of the house 106 may be represented by a set of geographical location coordinates or may be represented by an address.

The vehicle 102 detects the image data, determines at least one of sign data associated with the sign, house data associated with the house, and house location data associated with the house. The vehicle 102 communicates these various types of data to a server to update a database of listings. As more vehicles are used to update the database of listings, the time between updates may be reduced, and data refreshing frequency may reach a real-time updating of listings with data detected by a plurality of vehicles. The vehicle 102 may be driven by a prospective home buyer, or may be driven by a non-prospective home buyer (i.e., an individual who is not interested in purchasing or renting a home). The non-prospective home buyer may assist in enriching the listing data of houses that the non-prospective home buyer drives past, so that the entire market of prospective home buyers may benefit.

Figure 2:
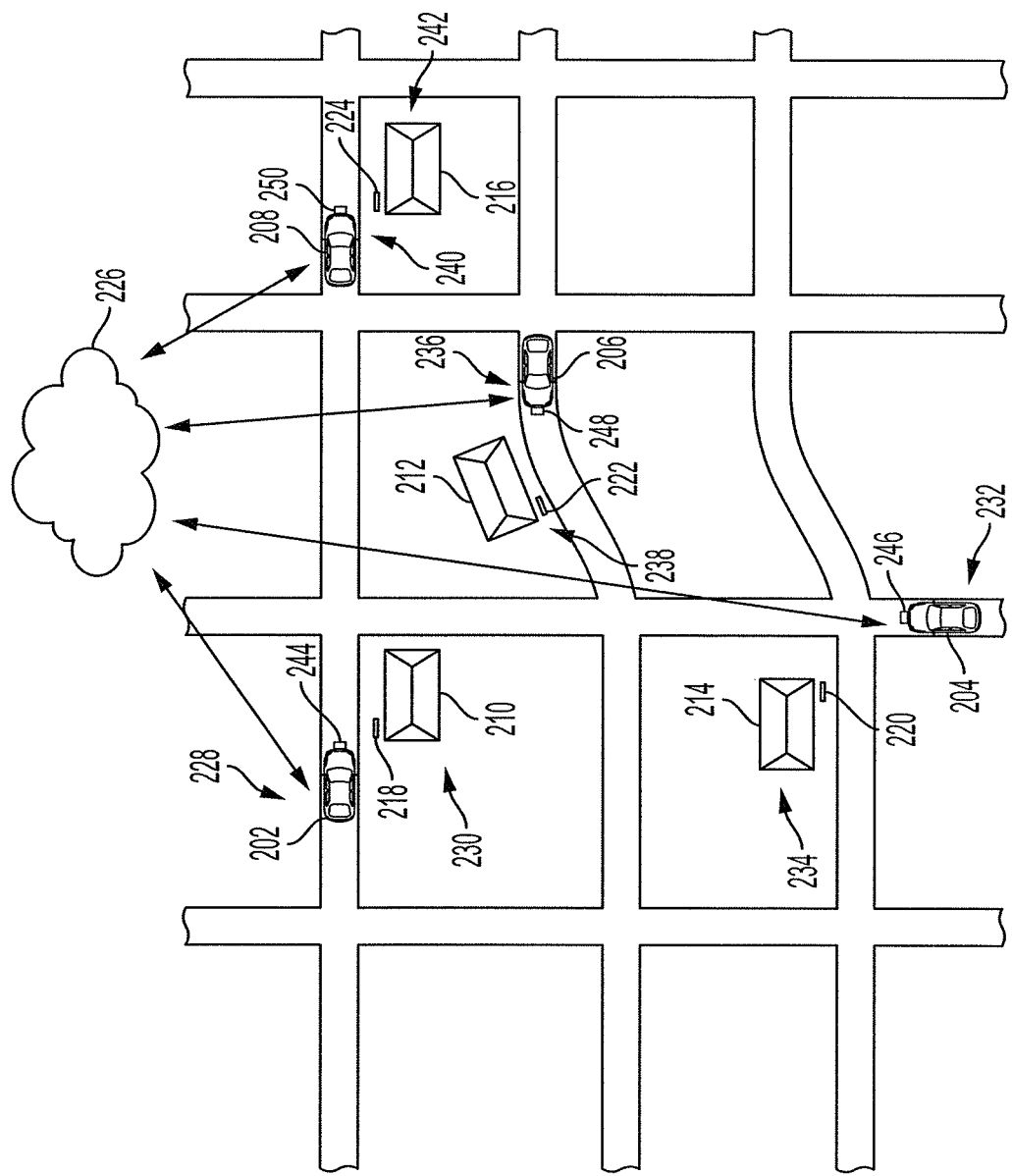
FIG. 2 illustrates a distributed real estate data gathering system, according to various embodiments of the invention.

FIG. 2 illustrates an overhead view of a neighborhood with multiple houses and multiple vehicles. A first vehicle 202 is at a first vehicle location 228 and approaches a first house 210 that has a first sign 218 and is located at a first house location 230. The first vehicle 202 has a first camera 244 that detects image data, and the first vehicle 202 determines sign data, house data, and house location data, as described herein with respect to FIG. 1. The first vehicle 202 communicates the sign data, house data, and house location data to a remote data server 226. The remote data server 226 may be a plurality of computing units and data storage units that may be remotely accessed via the Internet.

Similarly, a second vehicle 204 is at a second vehicle location 232 and approaches a second house 214 that has a second sign 220 and is located at a second house location 234. The second vehicle 204 has a second camera 246 that detects image data, and the second vehicle 204 determines sign data, house data, and house location data, as described herein with respect to FIG. 1. The second vehicle 204 communicates the sign data, house data, and house location data to the remote data server 226.

Likewise, a third vehicle 206 is at a third vehicle location 236 and approaches a third house 212 that has a third sign 222 and is located at a third house location 238. The third vehicle 206 has a third camera 248 that detects image data, and the third vehicle 206 determines sign data, house data, and house location data, as described herein with respect to FIG. 1. The third vehicle 206 communicates the sign data, house data, and house location data to the remote data server 226.

Finally, a fourth vehicle 208 is at a fourth vehicle location 240 and approaches a fourth house 216 that has a fourth sign 224 and is located at a fourth house location 242. The fourth vehicle 208 has a fourth camera 250 that detects image data, and the fourth vehicle 208 determines sign data, house data, and house location data, as described herein with respect to FIG. 1. The fourth vehicle 208 communicates the sign data, the house data, and the house location data to the remote data server 226.

In an example situation, the fourth vehicle 208 may detect the sign data, the house data, and the house location data associated with the fourth house 216 at a first time. The first vehicle 202 may detect the sign data, the house data, and the house location data associated with the first house 210 also at the first time, and then may continue driving and detect the sign data, the house data, and the house location data associated with the fourth house 216 at a second time that is later than the first time. In this example, the listing data associated with the fourth house 216 is updated at the first time (by the fourth vehicle 208) and also at the second time (by the first vehicle 202). Thus, the time between listing updates may be on the order of seconds. Compared to conventional listing updates, which may be on the order of days or weeks, this improvement is significant because purchasing a house is a time-sensitive process, and the more frequently updated the listing data is, the more efficiently the house buying process can be performed. Also, the accuracy is greatly improved due to the more frequent updates of the listing data.

In another example scenario, the remote data server 226 may not initially have a listing associated with the fourth house 216 because the fourth house 216 is being sold privately by the owner, in hopes of reducing fees associated with selling the house. The remote data server 226 may initially be populated with data from real estate listing services, which may not have all data associated with private listings. However, once the fourth vehicle 208 drives by the fourth house 216 and detects the sign data, the house data, and the house location data, the remote data server 226 may now have a listing associated with the fourth house 216. In this way, the systems and methods described herein provide an improvement to the listing responsiveness of private house listings. Using the systems and methods described herein, a house may have a listing associated with it moments after an individual places a sign outside of the house indicating that the house is for sale, whereas with conventional systems, the owner or a representative of the owner would have to submit a listing to a database, which is generally not updated immediately. If the owner did not have photographs of the house to accompany the new listing submission, the house may not be listed until the owner has the photographs. This could delay the new listing submission by days or even weeks. With the systems and methods described herein, the owners do not have to upload and take pictures themselves, as the vehicles collect house data associated with the house, including pictures and video.

In the same way, if the second house 214 were sold, and the owner removed the second sign 220 or changed the second sign to indicate that the house was sold, the next time a vehicle (e.g., the second vehicle 204) passed by the house, the listing would be updated, and prospective home buyers would know that the second house 214 is no longer for sale.

In some embodiments, the vehicles may passively collect image data of each house the vehicles drive past. In other embodiments, the vehicles may only detect image data for houses that have a sign (e.g., signs 107, 110), and the presence of a sign may serve as a trigger to the vehicle to begin detecting image data and determine the sign data, the house data, and the house location data. While ground-based vehicles (i.e., automobiles) are illustrated, the vehicles may be air-based, such as unmanned aerial vehicles.

Figure 3:
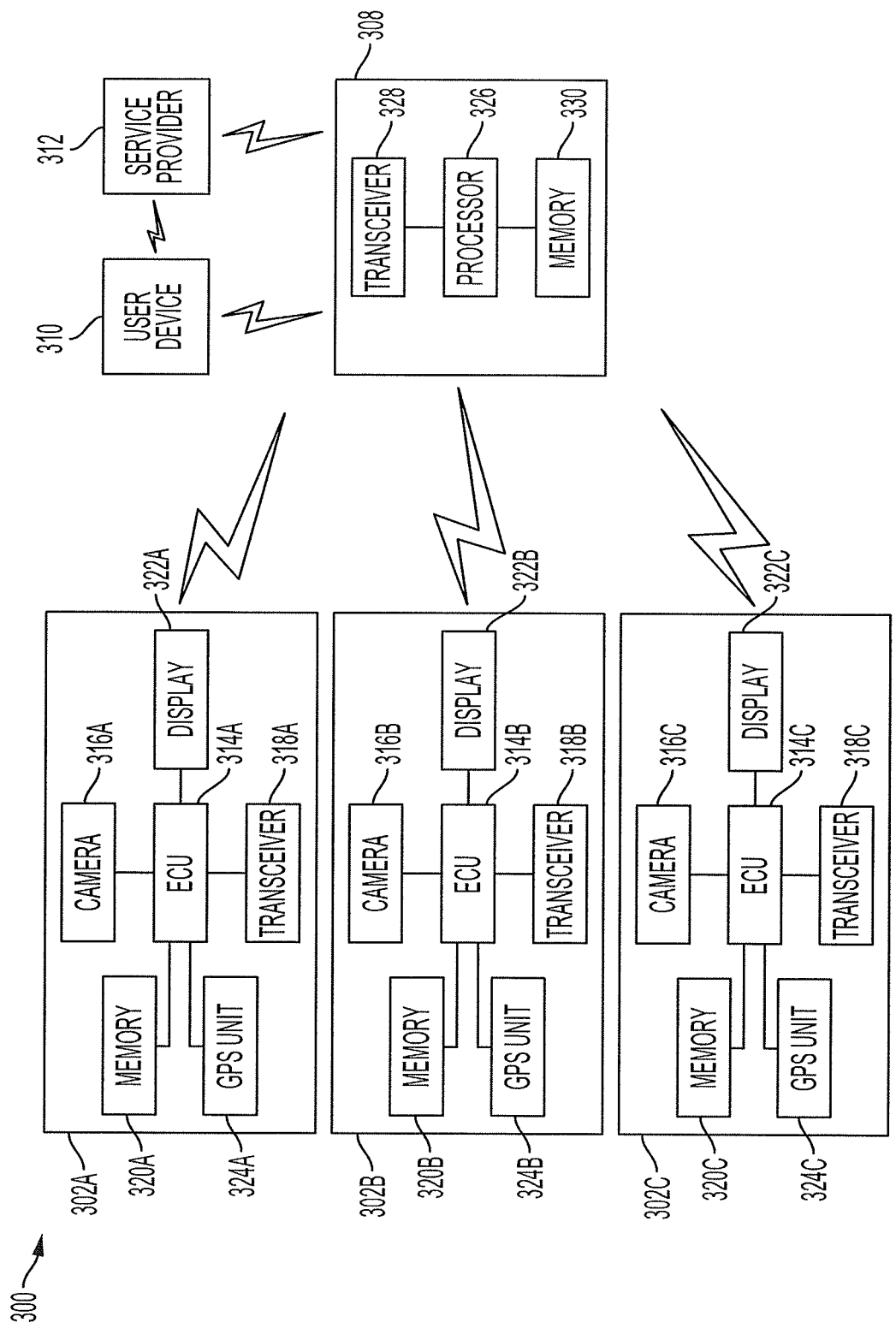
FIG. 3 illustrates a block diagram of the distributed real estate data gathering system, according to various embodiments of the invention.

FIG. 3 illustrates a block diagram of the system 300. The system 300 includes a first vehicle 302A, a second vehicle 302B, and a third vehicle 302C, each similar to the vehicles described in FIGS. 1 and 2. Components of the system having a letter suffix may be referred to individually or as a group by the reference number without the letter suffix (e.g., vehicle 302 may refer to each of the vehicles 302A, 302B, or 302C or may refer to the vehicles 302A, 302B, and 302C collectively).

The vehicle 302 may have an automatic or manual transmission. The vehicle 302 is a conveyance capable of transporting a person, an object, or a permanently or temporarily affixed apparatus. The vehicle 302 may be a self-propelled wheeled conveyance, such as a car, a sports utility vehicle, a truck, a bus, a van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 302 may be a semi-autonomous vehicle or an autonomous vehicle. That is, the vehicle 302 may be self-maneuvering and navigate without human input. An autonomous vehicle may use one or more sensors and/or a navigation unit to drive autonomously.

The first vehicle 302A includes an ECU 314A, a camera 316A, a transceiver 318A, a memory 320A, a display 322A, and a GPS unit 324A. The second vehicle 302B includes an ECU 314B, a camera 316B, a transceiver 318B, a memory 320B, a display 322B, and a GPS unit 324B. The third vehicle 302C includes an ECU 314C, a camera 316C, a transceiver 318C, a memory 320C, a display 322C, and a GPS unit 324C.

Each ECU 314 may be one or more ECUs, appropriately programmed, to control one or more operations of the vehicle. The one or more ECUs 314 may be implemented as a single ECU or in multiple ECUs. The ECU 314 may be electrically coupled to some or all of the components of the vehicle. In some embodiments, the ECU 314 is a central ECU configured to control one or more operations of the entire vehicle. In some embodiments, the ECU 314 is multiple ECUs located within the vehicle and each configured to control one or more local operations of the vehicle. In some embodiments, the ECU 314 is one or more computer processors or controllers configured to execute instructions stored in a non-transitory memory 320.

Each camera 316 is configured to detect image data. The image data may be associated with a sign (e.g., signs 218, 220, 222, 224). The image data may also be associated with a house (e.g., houses 210, 212, 214, 216). The image data may be in the form of individual still images, or in the form of a series of images as a video. The camera 316 may be one or more cameras located on the exterior of the vehicle, such as near the headlights of the vehicle, the grille of the vehicle, the rear view mirror of the vehicle, the side mirrors of the vehicle, or on the top of the vehicle. The camera 316 may be fixed in position or may be a rotating camera configured to be moved and detect image data in a plurality of angles and perspectives.

The vehicles 302 may be coupled to a network. The network, such as a local area network (LAN), a wide area network (WAN), a cellular network, a digital short-range communication (DSRC), the Internet, or a combination thereof, connects the vehicles 302 to a remote data server 308.

The transceiver 318 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 318 may transmit data to and receive data from devices and systems not directly connected to the vehicle. For example, the ECU 314 may communicate with the remote data server 308. Furthermore, the transceiver 318 may access the network, to which the remote data server 308 is also connected.

The GPS unit 324 is connected to the ECU 314 and configured to determine the location data. The ECU 314 may use the location data along with the map data stored in the memory 320 to determine a location of the vehicle. In other embodiments, the GPS unit 324 has access to the map data and may determine the location of the vehicle and provide the location of the vehicle to the ECU 314.

The memory 320 is connected to the ECU 314 and may be connected to any other component of the vehicle. The memory 320 is configured to store any data described herein, such as the map data, the location data, and any data received from the remote data server 308 via the transceiver 318.

The vehicle 302 also includes a display 322. The display 322 may be part of an infotainment unit. The display 322 may include multiple display screens. For example, the display 322 may be two screens—one for displaying a map, and another for displaying other information, such as house listing information for a particular house or the determined sign data, house data, and house location data of a house next to the vehicle.

Each of the vehicles 302 may detect image data associated with a sign and/or a house. The ECU 314 determines sign data based on the image data associated with the sign. As described herein, the sign data may include the name of a listing agent, a name of a listing realty company, a phone number, an email address, a fax number, a QR code, or a URL of a webpage. The ECU 314 may use machine learning techniques to determine the sign data from the image data detected by the camera.

The ECU 314 also determines house data based on the image data associated with the house. As described herein, the house data may include a number of windows, a number of garages, a lawn status, a number of trees, a status of the windows, a status of the garages, a paint color, a roof status, and/or a front door status. The ECU 314 may use machine learning techniques to determine the house data from the image data detected by the camera 316.

The GPS unit 324 detects the location data, and the ECU 314 uses the location data to determine a location of the house (e.g., house locations 230, 234, 238, 242). The location of the house may be in terms of location coordinates or may be an address. In some embodiments, the ECU 314 uses the transceiver 318 to access a database of addresses indexed by location coordinates to determine the address of a particular house. In some embodiments, the sign data may include the address of the house, and this may be used instead of the location data or may be used to verify the determined house location data.

Each of the vehicles 302 communicates the sign data, the house data, and the house location data to the remote data server 308 via the transceiver 318. The remote data server 308 includes a processor 326, a transceiver 328, and a memory 330. The processor 326 (and any processors described herein) may be a computer processor configured to execute instructions stored on a non-transitory memory. The memory 330 may be a non-transitory memory configured to store data associated with real estate listings. The transceiver 328 may be configured to transmit and receive data.

The remote data server 308 receives the sign data, the house data, and the house location data via the transceiver 328. The sign data, the house data, and the house location data may be saved in the memory 330. The processor 326 may determine whether any of the received sign data, house data, or house location data is new compared to the already stored data in the memory 330. When the data is new, the real estate listings stored on the memory 330 may be updated.

A prospective home buyer may have a user device 310, which may access the real estate listings updated based on the data from the vehicles 302. The user device 310 may access the data in memory 330 directly by directly communicating with the remote data server 308, or the user device 310 may access the data in memory 330 via a service provider 312, which has access to the data in the memory 330. The service provider 312 may have a memory of its own that is updated by the data in the memory 330 of the remote data server 308, or the service provider 312 may simply redirect the data from the memory 330 of the remote data server 308 to the user device 310.

The user device 310 may be any computing device, such as a computer or a mobile device. The prospective home buyer may view real-time updates of real estate listings using the user device 310, where the real-time updates are provided by the vehicles 302. The distributed data collecting and processing by the vehicles 302 allows for computational efficiency of the system 300 as a whole. For example, if the vehicles 302 merely collected the image data and communicated the image data to the remote data server 308 for processing, to determine the sign data, the house data, and the house location data, the processor 326 of the remote data server 308 would not be able to perform the computer processing as efficiently as the distributed system shown in FIG. 3.

While only three vehicles 302 are shown, any number of vehicles may be used. Likewise, while only one remote data server 308 is shown, any number of remote data servers in communication with each other may be used.

The systems and methods described herein may be further improved by smart realtor signs. Referring back to FIG. 1, the sign 107 or 110 may be a network-connected "smart" realtor sign capable of receiving and distributing listing data.

The vehicle 102 may be driven by a prospective home buyer, and when the vehicle 102 is in vicinity of the network-connected realtor sign, the network-connected realtor sign may communicate listing data to the vehicle 102 associated with the house 106. The listing data may be displayed by a display screen of the vehicle 102. The listing data may include details of the house 106, such as square footage, number of bedrooms, number of bathrooms, lot size, year the house was built, size of garage, and number of floors, for example. The communication of the listing data from the network-connected realtor sign to the vehicle 102 may be triggered by a communication from the vehicle 102 to the network-connected realtor sign, or the network-connected realtor sign may repeatedly broadcast the listing data associated with the house 106.

In addition to the listing data associated with the house 106, the network-connected realtor sign may also communicate to the vehicle listing data associated with other houses in the vicinity of the house 106. In some embodiments, the vehicle 102 communicates the preferences of the prospective home buyer, and the network-connected realtor sign provides listing data associated with other houses based on the preferences of the prospective home buyer. As will be described further herein, when there is no exact match of other houses or when the preferences of the prospective home buyer are not established, the network-connected realtor sign may use machine learning to determine one or more houses that the prospective home buyer may possibly be interested in.

When there is a match between the prospective home buyer's preferences and the house 106 or when the prospective home buyer indicates that he/she is interested in the house 106, the network-connected realtor sign may automatically provide a communication to a real estate agent associated with the house 106 that the prospective home buyer is interested in the house 106. The real estate agent associated with the house 106 may then set up an appointment with the prospective home buyer.

If the house 106 is unavailable, the network-connected realtor sign may automatically provide a communication to the prospective home buyer that the house 106 is unavailable. In some embodiments, the network-connected realtor sign may only provide suggestions of other listings when the house 106 is unavailable.

In this way, the network-connected realtor sign provides a localized, convenient, and efficient method of shopping for houses for prospective home buyers. The prospective home buyer may set up their preferences and simply drive around in the neighborhood the prospective home buyer is interested in, and the vehicle and the network of network-connected realtor signs provide information and facilitate the house purchasing process.

Figure 4A:
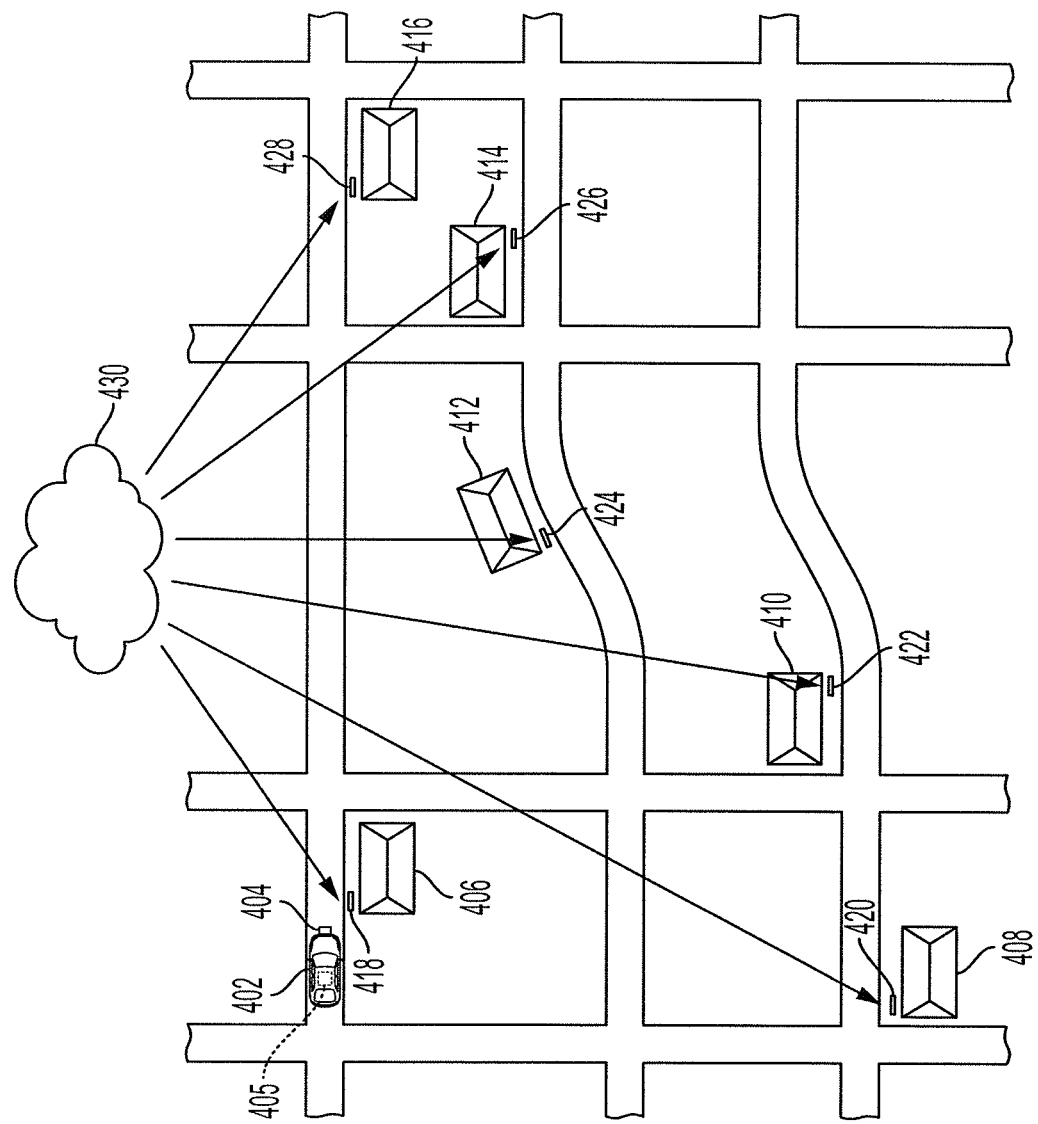
FIGS. 4A-4B illustrate a distributed real estate data distribution system, according to various embodiments of the invention.

FIG. 4A illustrates an overhead view of a neighborhood with multiple houses with network-connected realtor signs.

A vehicle 402 may have a camera 404 and a transceiver 405. When the vehicle 402 approaches a house 406 with a network-connected realtor sign 418, the vehicle 402 may detect the network-connected realtor sign 418. In some embodiments, the camera 404 of the vehicle 402 detects image data containing the network-connected realtor sign 418, and when the vehicle 402 determines that the network-connected realtor sign 418 is within the image data, the vehicle 402 initiates communication with the network-connected realtor sign 418 using the transceiver 405. In some embodiments, the transceiver 405 receives a broadcasted communication from the network-connected realtor sign 418, and in response, the transceiver 405 facilitates communication between the vehicle 402 and the network-connected realtor sign 418. In some embodiments, the transceiver 405 broadcasts a signal, and when then network-connected realtor sign 418 receives the signal from the transceiver 405, the network-connected realtor sign 418 begins communication with the vehicle 402.

This interaction between the vehicle 402 and other network-connected realtor signs 420, 422, 424, 426, and 428 of other houses 408, 410, 412, 414, and 428, respectively, may be similar. Each of the network-connected realtor signs 418, 420, 422, 424, 426, and 428 may be communicatively coupled to a remote data server 430. The remote data server 430 may store a database of listing information associated with each of the houses 406, 408, 410, 412, 414, and 428 associated with the network-connected realtor signs 418, 420, 422, 424, 426, and 428. Thus, when one network-connected realtor sign updates its listing information, the updated listing information is sent to the remote data server, and then distributed to the other network-connected realtor signs.

For example, the number of bedrooms of the first house 408, following a renovation, may be changed from 3 to 4. A user device, such as a computer or mobile device (e.g., a tablet or smartphone) may communicate with the first network-connected realtor sign 420 associated with the first house 408, and update the listing information associated with the first house 408. Therefore, when the vehicle 402 passes by the first house 408, the vehicle 402 now receives the updated information.

Then, the network-connected realtor sign 420 communicates the updated listing information to the remote data server 430, and the remote data server 430 communicates the updated listing information to the other network-connected realtor signs 418, 422, 424, 426, and 428. If the prospective home buyer in the vehicle 402 is looking for houses with 4 or more bedrooms, another network-connected realtor sign (e.g., network-connected realtor signs 418, 422, 424, 426, and 428) may refer the vehicle 402 to the first house 408. In this way, changes to listing information of a house may be updated and distributed in a more responsive and efficient manner.

Figure 4B:
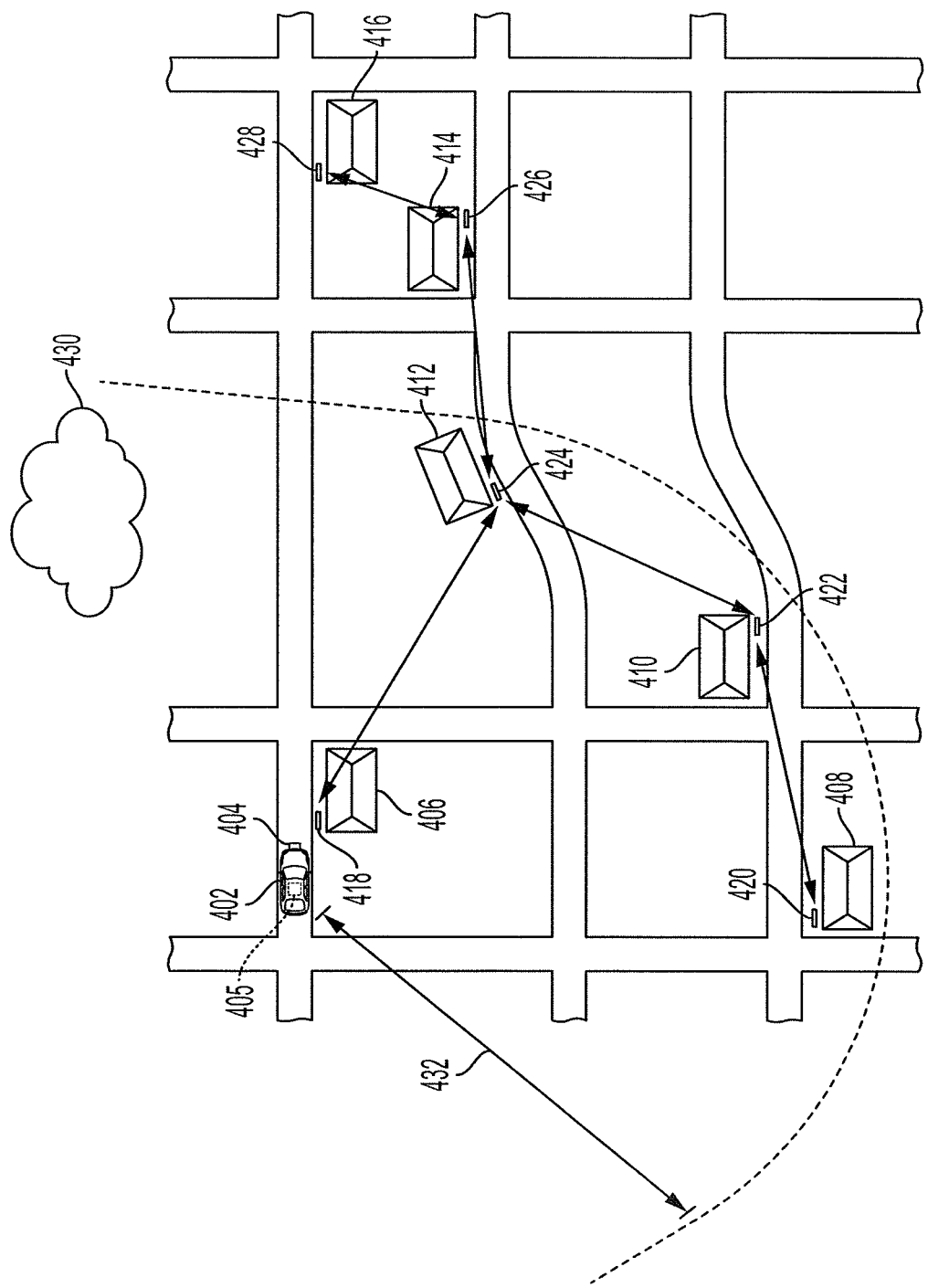

In addition to communicating with the remote data server 430, the network-connected realtor signs may communicate with each other, as shown in FIG. 4B. The network-connected realtor signs may have communication ranges, which allow them to communicate with one or more network-connected realtor signs in a predetermined vicinity. For example, network-connected realtor sign 418 is configured to communicate with network-connected realtor sign 424, which may communicate with network-connected realtor sign 426 and network-connected realtor sign 422. Network-connected realtor sign 426 may also communicate with network-connected realtor sign 428, and network-connected realtor sign 422 may also communicate with network-connected realtor sign 420.

The radius 432 around the vehicle 402 may represent a communication range of the transceiver 405 of the vehicle 402. Thus, as shown in FIG. 4B, the vehicle 402 may be capable of communicating with network-connected realtor signs 418, 424, 422, and 420, but not network-connected realtor signs 426 and 428.

The radius 432 around the vehicle 402 may also represent an area of interest of the prospective home buyer. Thus, as shown in FIG. 4B, the prospective home buyer may prefer to consider those houses within the radius 432 (e.g., houses 406, 408, 410, and 412) that meet the other criteria of the prospective home buyer. The network-connected realtor sign 418 may suggest houses outside of the radius 432 when none of the houses within the radius 432 match the preferences of the prospective home buyer.

Again, the network-connected realtor signs shown in FIG. 4B may also communicate with the remote data server 430, as shown in FIG. 4A. The vehicle 402 may also detect image data and may also determine the sign data, the house data, and the house location data, and may update the listings stored on the remote data server 430, as described with respect to FIG. 2. When the vehicle 402 updates the listing data stored on the remote data server 430, the updated listing data may be provided to the network-connected realtor signs. In this way, the listings provided by the remote data server 430 and the network-connected realtor signs may be validated by one or more vehicles (e.g., vehicle 402) that drive near the houses associated with the listings.

Figure 5:
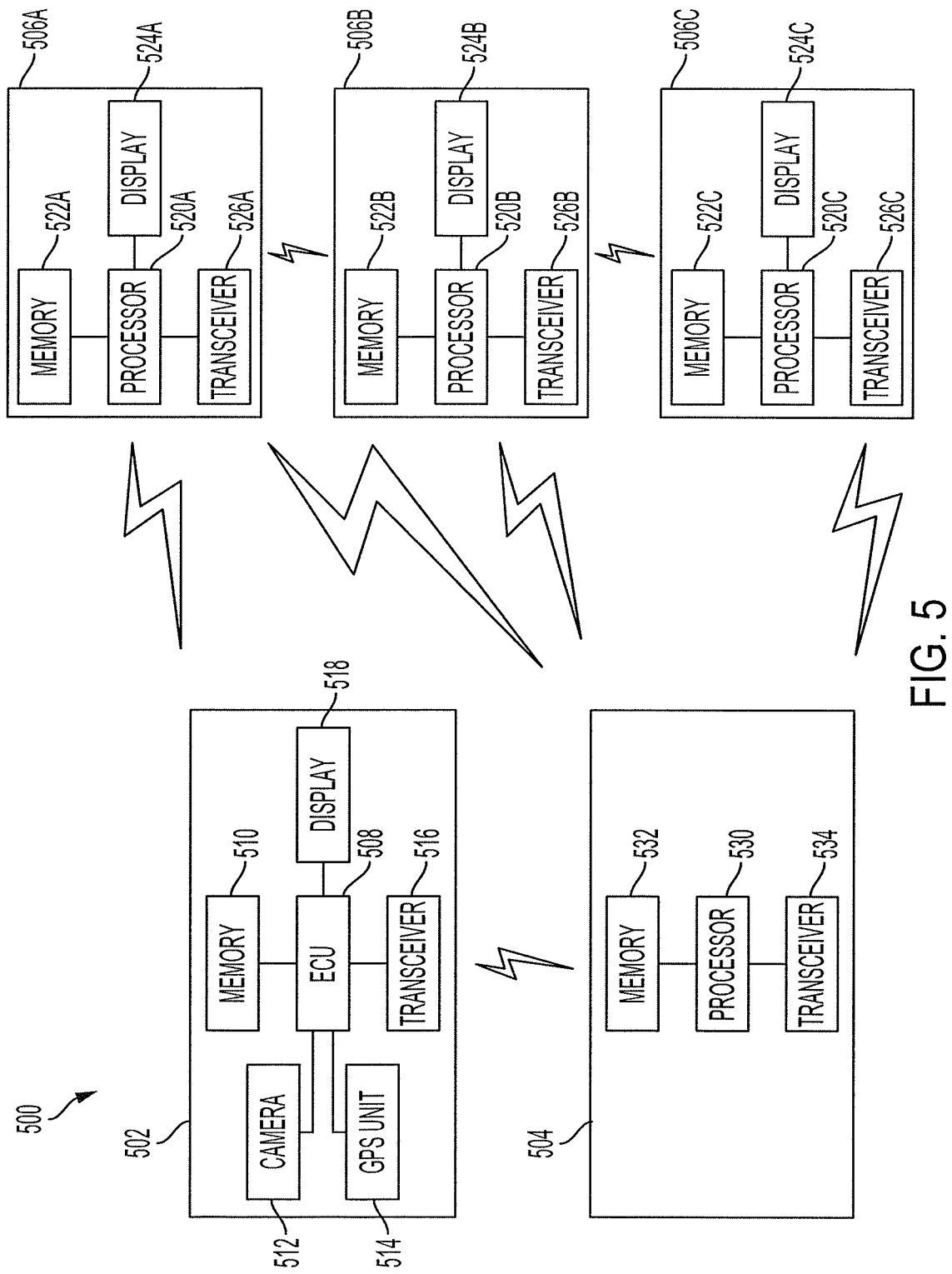
FIG. 5 illustrates a block diagram of the distributed real estate data distribution system, according to various embodiments of the invention.

FIG. 5 illustrates a block diagram of a system including a vehicle, a remote data server, and multiple network-connected realtor signs. The system 500 includes a vehicle 502 similar to the vehicles described herein with respect to FIGS. 1, 2, 3, 4A, and 4B. The system 500 also includes a remote data server 504 similar to remote data servers 226, 308, and 430. The system 500 also includes multiple network-connected realtor signs 506 (e.g., network-connected realtor sign 506A, network-connected realtor sign 506B, and network-connected realtor sign 506C) similar to the network-connected realtor signs of FIGS. 4A and 4B.

The remote data server 504 includes a processor 530 connected to a memory 532 and a transceiver 534. The memory 532 may be similar to memory 330, and is configured to store listing data associated with various houses. The transceiver 534 may be similar to transceiver 328, and is configured to receive and transmit data to and from the vehicle 502 and each of the network-connected realtor signs 506.

The vehicle 502 includes an ECU 508 connected to a memory 510, a camera 512, a GPS unit 514, a transceiver 516, and a display 518.

The ECU 508 is similar to ECU 314, and may be one or more ECUs, appropriately programmed, to control one or more operations of the vehicle 502. The one or more ECUs 508 may be implemented as a single ECU or in multiple ECUs. The ECU 508 may be electrically coupled to some or all of the components of the vehicle. In some embodiments, the ECU 508 is a central ECU configured to control one or more operations of the entire vehicle. In some embodiments, the ECU 508 is multiple ECUs located within the vehicle and each configured to control one or more local operations of the vehicle. In some embodiments, the ECU 508 is one or more computer processors or controllers configured to execute instructions stored in a non-transitory memory 510.

Camera 512 is similar to camera 316, and is configured to detect image data. The image data may be associated with a realtor sign (both network-connected realtor signs and non-network-connected realtor signs). The image data may also be associated with a house. The image data may be in the form of individual still images, or in the form of a series of images as a video. The camera 512 may be one or more cameras located on the exterior of the vehicle, such as near the headlights of the vehicle, the grille of the vehicle, the rear view mirror of the vehicle, the side mirrors of the vehicle, or on the top of the vehicle. The camera 512 may be fixed in position or may be a rotating camera configured to be moved and detect image data in a plurality of angles and perspectives. As described herein, the image data may be analyzed by the ECU 508 to determine sign data, house data, and house location data. The sign data, the house data, and the house location data may be provided to the remote data server 504 to update the listing data of the remote data server 504.

The vehicle 502 may be coupled to a network. The network, such as a local area network (LAN), a wide area network (WAN), a cellular network, a digital short-range communication (DSRC), the Internet, or a combination thereof, connects the vehicle 502 to a remote data server 504 or any of the network-connected realtor signs 506.

The transceiver 516 is similar to transceiver 318, and may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G or 5G). The transceiver 516 may transmit data to and receive data from devices and systems not directly connected to the vehicle. For example, the ECU 508 may communicate with the remote data server 504 or any of the network-connected realtor signs 506. Furthermore, the transceiver 516 may access the network, to which the remote data server 504 and network-connected realtor signs 506 are also connected.

The GPS unit 514 is similar to GPS unit 324, and is connected to the ECU 508 and configured to determine location data. The ECU 508 may use the location data along with map data stored in memory 510 to determine a location of the vehicle. In other embodiments, the GPS unit 514 has access to the map data and may determine the location of the vehicle and provide the location of the vehicle to the ECU 508.

The memory 510 is connected to the ECU 508 and may be connected to any other component of the vehicle. The memory 510 is configured to store any data described herein, such as the map data, the location data, and any data received from the remote data server 504 via the transceiver 516.

The vehicle 502 also includes a display 518 similar to display 322. The display 518 may be part of an infotainment unit. The display 518 may include multiple display screens. For example, the display 518 may be two screens—one for displaying a map, and another for displaying other information, such as house listing information for a particular house or the determined sign data, house data, and house location data of a house next to the vehicle.

A prospective home buyer inside of the vehicle 502 may store one or more house preferences in the memory 510. The house preferences may be one or more features of a house that the prospective home buyer desires, such as a number of bedrooms, a number of bathrooms, a range of square footage, a range of listing prices, a square footage of the house, a square footage of the lot, a number of garage spaces, a square footage of lawn, whether there is a pool, whether there are HOA or other monthly fees associated with the house, or a rating of nearby schools, for example. The house preferences may also include an indication of a preference strength or weight associated with each preference. These preference strengths or weights may provide a relative level of importance to the prospective home buyer of each preference. For example, a prospective home buyer may like to have a pool, but could live without one, but would absolutely need at least four bedrooms and at least three bathrooms. In this example, the house preferences of the prospective home buyer may include a strength or weight associated with each of these house preferences that reflect the importance to the prospective home buyer (e.g., on a scale of 1-10, the house preference of four bedrooms may have a 10, three bathrooms may have a 10, and a pool may have a 3). These house preferences may be stored as house preference data in the memory 510.

Each of the network-connected realtor signs 506 may include a processor 520, a memory 522, a display 524, and a transceiver 526. The memory 522 may be similar to any of the other memory devices described herein. The memory 522 may be configured to store listing data associated with the house the particular network-connected realtor sign is associated with.

The transceiver 526 may be similar to any of the other transceivers described herein, and may be used to facilitate communication of data from the network-connected realtor sign 506 to a vehicle 502, another network-connected realtor sign, or the remote data server 504.

The display 524 of the network-connected realtor sign 506 may be a dynamically changing display of information associated with the house. For example, if the house was recently renovated to have a new third bedroom, the display 524 may be updated to show that the house has three bedrooms instead of two.

The network-connected realtor sign 506 may receive a communication of house preference data from the vehicle 502 via the transceiver 526. The processor 520 may compare the house preference data to the listing data for the particular house stored in the memory 522. When the house preference data matches the listing data for the particular house, the network-connected realtor sign 506 may communicate an indication to the vehicle 502 that there is a match and/or communicate an indication to the listing real estate agent associated with the particular house the contact information of the prospective home buyer. When the house preference data does not match the listing data for the particular house, the network-connected realtor sign 506 may search for other houses that may match the house preference data. When there is a match, the network-connected realtor sign 506 may communicate the listing information associated with the matching house to the vehicle 502.

In some embodiments, in order to search for other houses that may match the house preference data of the prospective home buyer, the network-connected realtor sign 506 may send a request for listing information to other nearby network-connected realtor signs. The other nearby network-connected realtor signs may send back listing data associated with their respective houses.

In some embodiments, in order to search for other houses that may match the house preference data of the prospective home buyer, the network-connected realtor sign 506 may send a request for listing information and the house preference data to the remote data server 504. The remote data server 504 may send back listing data associated with houses in a predetermined area of the network-connected realtor sign 506 that match the house preference data.

When no exact match to the house preference data exists, machine learning (performed by either the processor 520 of the network-connected realtor sign 506 or the processor 530 of the remote data server 504) may be used to determine whether any of the houses in the vicinity of the vehicle 502 may be acceptable to the prospective home buyer.

The machine learning process may use training data of recent trends in house purchases, as well as training data of preferences of the prospective home buyer in order to determine whether a non-matching house may be acceptable to the prospective home buyer. The training data of preferences of the prospective home buyer may be determined from reactions to many listings provided to the prospective home buyer via an app or a website. The training data of preferences of the prospective home buyer may also be determined from reactions to houses that are passed by the prospective home buyer while in the vehicle 502.

In some embodiments, a user device, such as a tablet or smartphone may be used by the prospective home buyer, and the user device may contain a processor, a memory similar to memory 510, a display similar to display 518, and a transceiver similar to transceiver 516. In these embodiments, the user device may communicate with the network-connected realtor signs 506 and the remote data server 504 instead of or in addition to the vehicle 502.

As used herein, a "unit" may refer to hardware components, such as one or more computer processors, controllers, or computing devices configured to execute instructions stored in a non-transitory memory.

Figure 6A:
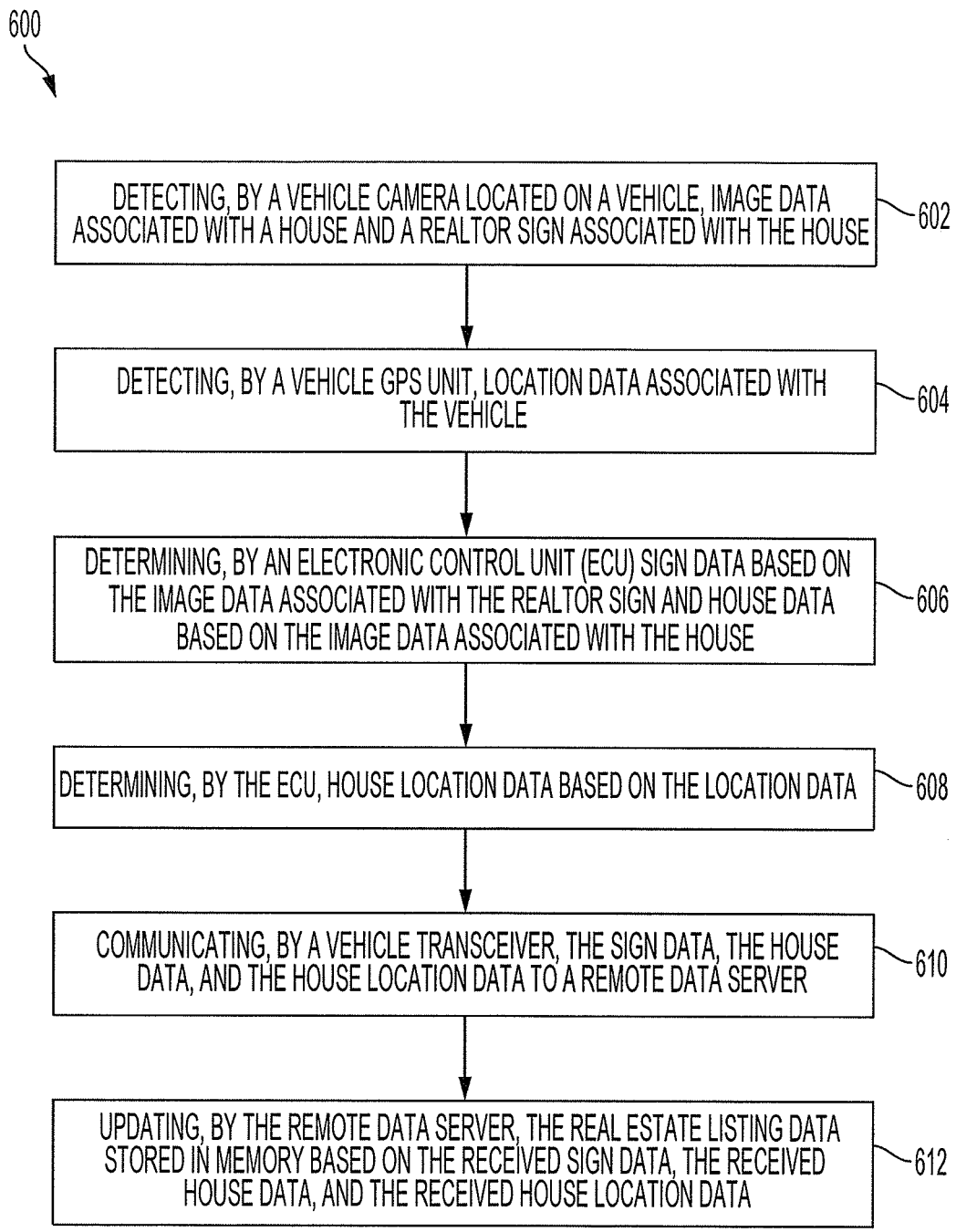
FIGS. 6A-6D illustrate processes of the distributed real estate data gathering system and the distributed real estate data distribution system, according to various embodiments of the invention.

FIG. 6A is a flow diagram of a process 600 of gathering real estate data. A vehicle camera (e.g., vehicle camera 316, 244, 246, 248, 250) detects image data associated with a house (e.g., house 210, 212, 214, 216) and a realtor sign (e.g., realtor sign 218, 220, 222, 224) associated with the house (step 602). The vehicle having the vehicle camera may be driven or occupied by a prospective home buyer, or may be driven or occupied by an individual who is uninteresting in purchasing a house, or may be driven autonomously. The image data may be in the form of single images or a video.

A vehicle GPS unit (e.g., GPS unit 324) detects location data associated with the vehicle (step 604). The location data may correspond to the location of the vehicle (e.g., vehicle location 228, 232, 236, 240). The location data may be in terms of geographical coordinates, such as a latitude and longitude.

An electronic control unit (ECU) (e.g., ECU 314) determines sign data based on the image data and house data based on the image data (step 606). The sign data may include a name of a listing agent, a name of a listing realty company, a phone number, an email address, a fax number, a QR code, or a URL of a webpage, for example. The sign data may also include the address of the house 106 and may also include a status of the house, such as for sale, for rent, sold, or under contract, for example. The sign data may also include other information, such as whether the house is being sold directly by the owner, open house information, or house features, for example. The ECU may determine the sign data from the image data using machine learning techniques. In some embodiments, the ECU may be trained, using training data, to identify a sign, and then to identify and classify information from the sign.

The house data may include a number of windows, a number of garages, a lawn status, number of trees, a status of the windows, a status of the garages, a paint color, a roof status, or a front door status, for example. The ECU may determine house data from the image data using machine learning techniques. In some embodiments, the ECU may be trained, using training data, to identify a house, and then to identify various characteristics of the house based on the image data. The ECU may be configured to identify various conditions of features of the house, such as whether a feature is broken or not broken, or clean or dirty. The ECU may use stored or retrieved image data of the house detected at a previous time, to compare the current image data to, in order to determine if the condition of any features of the house have changed.

The ECU determines house location data based on the location data (step 608). The house location data may be associated with the location of the house (e.g., house location 230, 234, 238, 242). The house location data may be in terms of geographical coordinates or an address of the house. The ECU may use the location data and the image data to determine the house location data. For example, the ECU may be configured to determine a distance between the vehicle camera and a house based on the image data or successive images in a series of images in combination with a known and recorded speed of travel of the vehicle. The ECU may then use the determined distance between the vehicle and the house to determine the house location data. The ECU may determine an address of the house based on the image data when an address number and a street name are shown in the image data.

The vehicle transceiver (e.g., transceiver 318) communicates the sign data, the house data, and the house location data to a remote data server (e.g., remote data server 308) (step 610). The remote data server receives the sign data, the house data, and the house location data.

The remote data server updates the real estate listing data associated with the house based on the received sign data, house data, and the house location data (step 612). In some embodiments, the remote data server includes a non-transitory memory configured to store real estate listing data associated with a house, and indexed by a house location. The house location data may be used to access the stored real estate listing data of the house, and the remote data server may then compare the real estate listing data to the received sign data and house data. When there is a difference, the real estate listing data may be updated, and a date associated with when the real estate listing data was last updated or verified may be updated. When there is no difference, the date associated with when the real estate listing data was last updated or verified may be updated.

The remote data server may receive the sign data, the house data, and the house location data from a plurality of vehicles, and as a result, the real estate listing data stored by the remote data server may be frequently updated. The more frequently the real estate listing data is updated, the more efficient, accurate and reliable the information may be.

Figure 6B:
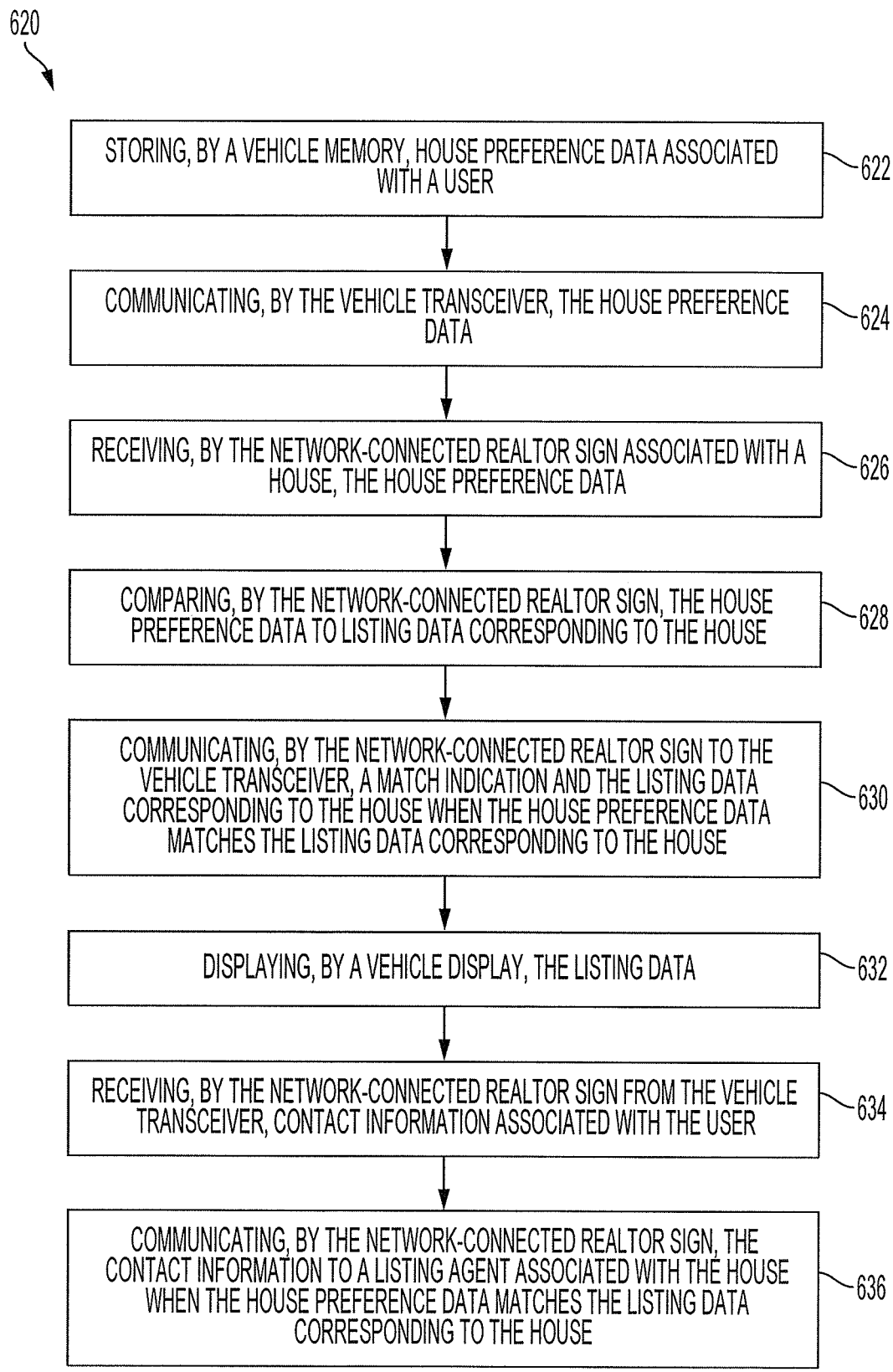

FIG. 6B is a flow diagram of a process 620 of distributing real estate data. A vehicle memory (e.g., memory 510) stores house preference data associated with a user (step 622). The house preference data may be one or more features of a house that the user desires, such as a number of bedrooms, a number of bathrooms, a range of square footage, a range of listing prices, a square footage of the house, a square footage of the lot, a number of garage spaces, a square footage of lawn, whether there is a pool, whether there are HOA or other monthly fees associated with the house, or a rating of nearby schools, for example. The house preference data may also include an indication of a preference strength or weight associated with each preference. These preference strengths or weights may provide a relative level of importance of each preference to the user.

A vehicle transceiver (e.g., transceiver 516) communicates the house preference data (step 624), which is received by a network-connected realtor sign (e.g., network-connected realtor sign 506, 418, 420, 422, 424, 426, 428) (step 626). The network-connected realtor sign may be located in front of or adjacent to a house that is for sale or rent, and the network-connected realtor sign may be configured to communicate with at least one of a vehicle, a remote data server, or one or more other network-connected realtor signs.

The network-connected realtor sign may store real estate listing data associated with the house it is in front of or adjacent to. The network-connected realtor sign compares the real estate listing data of the house and the received house preference data (step 628). By comparing the real estate listing data of the house and the received house preference data of the user, the network-connected realtor sign may be determining whether the features of the house fit within the preferences of the user. For example, if the real estate listing data of the house indicates that the house has three bedrooms, two bathrooms, and 1700 square feet, and the received house preference data indicates a preference for a house with at least two bedrooms, two bathrooms, and at least 1500 square feet, the network-connected realtor sign would determine that there is a match between the house and the house preferences of the user.

The network-connected realtor sign communicates to the vehicle transceiver a match indication and the real estate listing data of the house when the house preference data and the real estate listing data of the house match (step 630).

The vehicle display (e.g., display 518) may display the listing data (step 632). The display of the listing data may include a list of features of the house, as well as photographs of the house and any contact information of the listing agent, the listing agency, or the homeowner (if the homeowner is selling privately). The display of the listing data may include an at-a-glance summary of features of the house that match the house preferences of the user, and features of the house that may not match the house preferences of the user.

The network-connected realtor sign may automatically also communicate contact information of the user to the listing agent, the listing agency, or the homeowner when the house preference data matches the real estate listing data associated with the house (step 636).

Figure 6C:
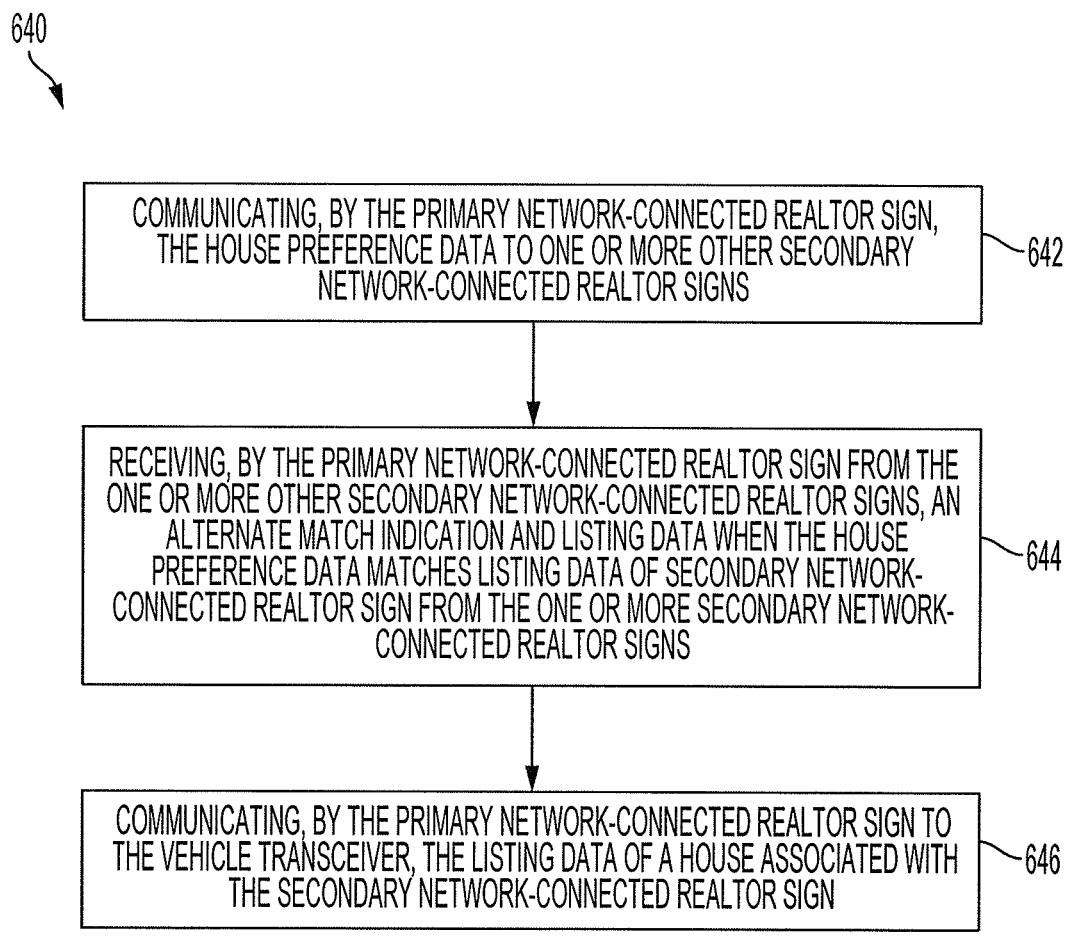
Figure 6D:
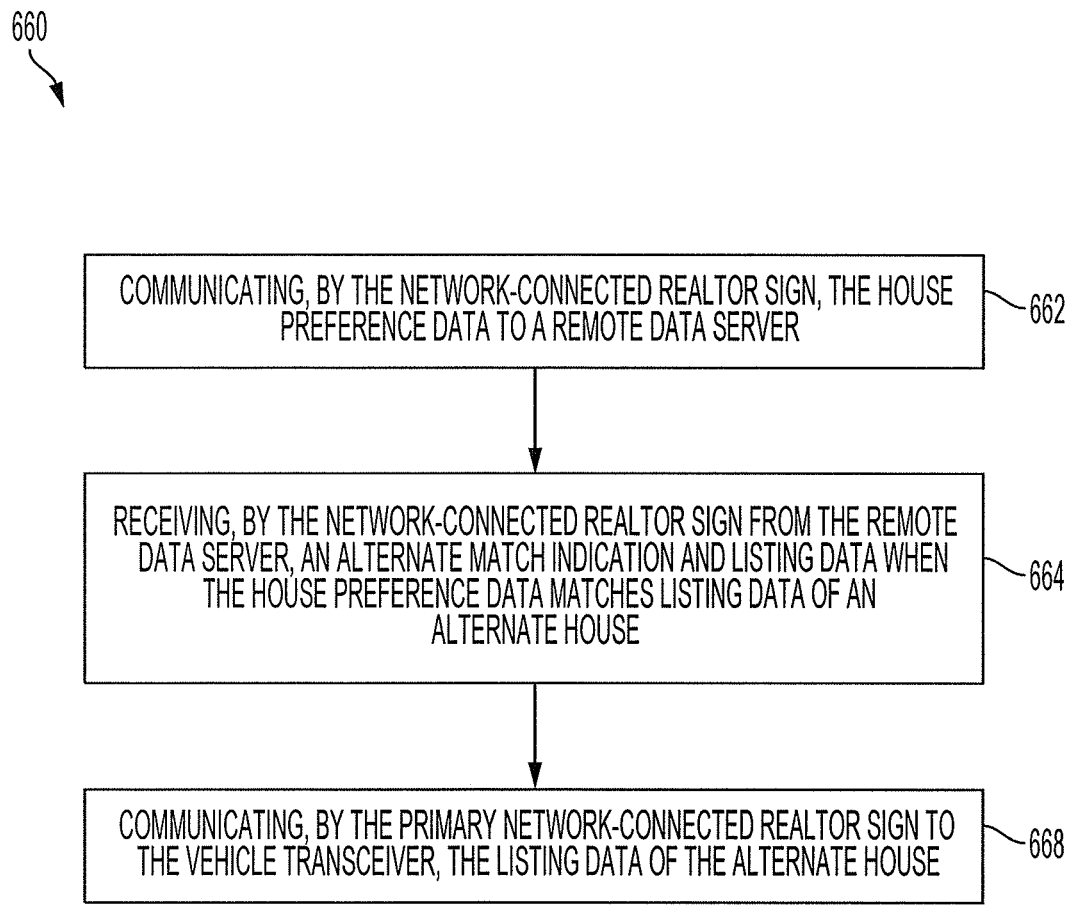

When the house preference data does not match the real estate listing data associated with the house, the network-connected realtor sign may send a communication to one or more other network-connected realtor signs (as shown in FIG. 6C) and/or may send a communication to a remote data server (as shown in FIG. 6D).

FIG. 6C illustrates a flow diagram of a process 640 of communication by the network-connected realtor sign when the house preference data does not match the real estate listing data associated with the house.

The "primary" network-connected realtor sign communicates the house preference data of the user to one or more other "secondary" network-connected realtor signs that are in proximity to the primary network-connected realtor sign (step 642).

The one or more other secondary network-connected realtor signs receive the house preference data of the user and compare the house preference data of the user to the real estate listing data of the house the particular secondary network-connected realtor sign is associated with. When there is no match, the secondary network-connected realtor sign may again pass on the house preference data of the user to one or more additional network-connected realtor signs.

When the real estate listing data of the secondary network-connected realtor sign matches the house preference data of the user, the secondary network-connected realtor sign communicates an alternate match indication and listing data to the primary network-connected realtor sign (step 644).

The primary network-connected realtor sign communicates the listing data to the vehicle transceiver (step 646). The vehicle display may display the listing data and/or an at-a-glance summary of features of the house that match the house preferences of the user, and features of the house that may not match the house preferences of the user. The ECU may determine navigation directions to the house associated with the secondary network-connected realtor sign, and the display may display turn-by-turn navigation directions for travelling to the house.

FIG. 6D illustrates a flow diagram of a process 660 of communication by the network-connected realtor sign when the house preference data does not match the real estate listing data associated with the house.

The network-connected realtor sign may communicate the house preference data of the user to a remote data server (e.g., remote data server 504) (step 662). As described herein, the remote data server may have a memory configured to store real estate listing data of a plurality of houses that are available for sale or rent. The remote data server may compare the house preference data to the real estate listing data stored in memory (e.g., memory 532).

When the remote data server determines a match, the remote data server communicates an alternate match indication and the listing data of the matching house. The network-connected realtor sign receives the alternate match indication and the listing data of the alternate house (step 664). In some embodiments, a plurality of listing data entries of respective matching houses are communicated from the remote data server to the network-connected realtor sign.

The network-connected realtor sign communicates the listing data to the vehicle transceiver (step 668). The vehicle display may display the listing data and/or an at-a-glance summary of features of the house that match the house preferences of the user, and features of the house that may not match the house preferences of the user. The ECU may determine navigation directions to the alternate house, and the display may display turn-by-turn navigation directions for travelling to the alternate house.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for gathering real estate listing data, the system comprising:
    a vehicle camera located on a vehicle and configured to detect image data associated with a house and a network-connected realtor sign associated with the house;
    a vehicle navigation unit configured to detect a location of the vehicle;

an electronic control unit (ECU) connected to the vehicle camera and the vehicle navigation unit and configured to:
  determine sign data based on the image data associated with the network-connected realtor sign and house data based on the image data associated with the house, and
  determine house location data based on the location of the vehicle;
a vehicle transceiver connected to the ECU and configured to communicate at least one of the sign data, the house data, or the house location data; and
a remote data server configured to:
  receive the at least one of the sign data, the house data, or the house location data,
  obtain user reaction data related to the at least one of the sign data, the house data, or the house location data,
  utilize the user reaction data as training data of a machine learning algorithm to identify one or more real estate properties,
  automatically update the real estate listing data based on the identified one or more real estate properties, and
  provide the updated real estate listing data to the network-connected realtor sign or one or more other network-connected realtor signs.

2. The system of claim 1, wherein the sign data includes at least one of a name of a listing agent, a name of a listing realty company, a phone number, an email address, a fax number, a QR code, or a URL of a webpage.

3. The system of claim 1, wherein the house data includes at least one of a number of windows, a number of garages, a lawn status, a number of trees, a status of the windows, a status of the garages, a paint color, a roof status, or a front door status.

4. The system of claim 1, wherein the house location data are geographical coordinates of the house or an address of the house.

5. The system of claim 1, further comprising a plurality of other vehicles each having a respective vehicle camera, a respective vehicle navigation unit, a respective ECU, and a respective vehicle transceiver, and
  wherein each vehicle of the plurality of other vehicles is configured to determine respective sign data, respective house data, and respective house location data and communicate the determined respective sign, house, and house location data to the remote data server to continuously and automatically update the real estate listing data in a computationally efficient and distributed manner.

6. The system of claim 1, further comprising a user device configured to communicate with the remote data server and access the real estate listing data stored on the remote data server.

7. The system of claim 1, wherein the ECU is configured to use machine learning to determine the sign data and the house data from the image data.

8. A method for gathering real estate listing data, the method comprising:
  detecting, by a vehicle camera located on a vehicle, image data associated with a house and a network-connected realtor sign associated with the house;
  detecting, by a vehicle navigation unit, location data associated with the vehicle;
  determining, by an electronic control unit (ECU) connected to the vehicle camera and the vehicle navigation unit, sign data based on the image data associated with the network-connected realtor sign and house data based on the image data associated with the house;
  determining, by the ECU, house location data based on the location data;
  communicating, by a vehicle transceiver, at least one of the sign data, the house data, or the house location data;
  receiving, by a remote data server, the at least one of the sign data, the house data, or the house location data;
  obtaining, by the remote data server, user reaction data related to the at least one of the sign data, the house data, or the house location data;
  identifying, by the remote data server utilizing the user reaction data, one or more real estate properties;
  automatically updating, by the remote data server, the real estate listing data based on the identified one or more real estate properties;
  providing, by the ECU and to the network-connected realtor sign or one or more other network-connected realtor signs, the updated real estate listing data; and
  displaying, on the network-connected realtor sign or the one or more other network-connected realtor signs, the updated real estate listing data.

9. The method of claim 8, wherein the ECU is further configured to use machine learning to determine the sign data and the house data from the image data.

10. The method of claim 8, wherein the network-connected realtor sign is communicatively coupled to the one or more other network-connected realtor signs and the remote data server, and
  wherein the method further comprises:
    storing, by a vehicle memory, house preference data associated with a user;
    communicating, by the vehicle transceiver, the house preference data;
    receiving, by the network-connected realtor sign associated with the house, the house preference data;
    comparing, by the network-connected realtor sign, the house preference data to listing data corresponding to the house; and
    communicating, by the network-connected realtor sign, a match indication to the vehicle transceiver when the house preference data matches the listing data corresponding to the house.

11. The method of claim 10, further comprising:
  communicating, by the network-connected realtor sign, the house preference data to the one or more other network-connected realtor signs;
  receiving, by the network-connected realtor sign from the one or more other network-connected realtor signs, an alternate match indication when the house preference data matches listing data of an alternate house; and
  communicating, by the network-connected realtor sign to the vehicle transceiver, an address of the alternate house.

12. The method of claim 10, further comprising:
  communicating, by the network-connected realtor sign, the house preference data to the remote data server;
  receiving, by the network-connected realtor sign from the remote data server, an alternate match indication when the house preference data matches listing data of an alternate house; and
  communicating, by the network-connected realtor sign to the vehicle transceiver, an address of the alternate house.

13. The method of claim 10, further comprising:
communicating, by the network-connected realtor sign to the vehicle transceiver, the listing data corresponding to the house when the house preference data matches the listing data corresponding to the house; and
displaying, by a vehicle display, the listing data.

14. An apparatus for gathering real estate listing data, the apparatus comprising:
a data server configured to:
receive, from a vehicle, at least one of sign data, house data, or house location data, the sign data including data associated with a network-connected realtor sign related to a house, the house data including data associated with the house, the house location data including a location of the house,
obtain user reaction data related to the at least one of the sign data, the house data, or the house location data,
utilize the user reaction data as training data of a machine learning algorithm to identify one or more real estate properties, and
automatically update the real estate listing data based on the identified one or more real estate properties.

15. The apparatus of claim 14, wherein the sign data includes at least one of a name of a listing agent, a name of a listing realty company, a phone number, an email address, a fax number, a QR code, or a URL of a webpage.

16. The apparatus of claim 14, wherein the house data includes at least one of a number of windows, a number of garages, a lawn status, a number of trees, a status of the windows, a status of the garages, a paint color, a roof status, or a front door status.

17. The apparatus of claim 14, wherein the house location data are geographical coordinates of the house or an address of the house.

18. The apparatus of claim 14, wherein the data server is further configured to:
receive, from a plurality of other vehicles, respective sign data, respective house data, or respective house location data, and
modify the updated real estate listing data further based on the respective sign data, the respective house data, or the respective house location data.

19. The apparatus of claim 14, wherein the data server is further configured to receive the user reaction data from a user device configured to communicate with the data server.

20. The apparatus of claim 14, wherein the data server is further configured to transmit the updated real estate listing data to one or more network-connected realtor signs including the network-connected realtor sign and configured to display the updated real estate listing data.

* * * * *